US007056082B1

(12) United States Patent
Taylor

(10) Patent No.: US 7,056,082 B1
(45) Date of Patent: Jun. 6, 2006

(54) FOUR CYCLE WIND IMPLOSION ENGINE

(76) Inventor: John B. Taylor, 5640 Encore Dr., Dallas, TX (US) 75240

( * ) Notice: Subject to any disclaimer, the term of this patent is extended or adjusted under 35 U.S.C. 154(b) by 0 days.

(21) Appl. No.: 10/906,235

(22) Filed: Feb. 10, 2005

(51) Int. Cl.
*F03D 3/04* (2006.01)
*F03D 7/06* (2006.01)
(52) U.S. Cl. .................. 415/4.2; 415/13; 415/907; 416/197 A
(58) Field of Classification Search ............... 415/4.2, 415/4.4, 13, 907; 416/31, 37, 41, 175, 197 A, 416/197 R, 203, 228
See application file for complete search history.

(56) References Cited

U.S. PATENT DOCUMENTS

| 561,040 A * | 5/1896 | Zwiebel ................... 415/4.2 |
| 4,005,947 A * | 2/1977 | Norton et al. ............. 416/197 A |
| 4,031,405 A * | 6/1977 | Asperger ................... 290/55 |
| 4,362,470 A * | 12/1982 | Locastro et al. .......... 416/197 A |
| 5,038,049 A * | 8/1991 | Kato ....................... 290/55 |

* cited by examiner

*Primary Examiner*—Edward K. Look
*Assistant Examiner*—Nathan Wiehe
(74) *Attorney, Agent, or Firm*—David V. Thompson

(57) ABSTRACT

A wind energy machine has four rotor chambers formed by perpendicular walls. Each rotor chamber has an intake portion, a reversal portion, a parallel portion, and an exhaust portion. Air flow is reversed in each chamber for every 90 degrees of rotation, such that the intake portion becomes an exhaust and the exhaust portion becomes and inlet.

13 Claims, 3 Drawing Sheets

FOUR CYCLE WIND IMPLOSION ENGINE

BACKGROUND OF THE INVENTION

Wind energy machines are generally divided into the two categories of cross axis and wind axis devices. A wind axis machine has its blades radiating out from a central axis, like a propeller. This rotational axis must align with the wind for energy production, thus the term wind axis. The cross axis rotor or turbine has its axis of rotation, about which its blades revolve, perpendicular to the wind.

Cross axis rotors can be driven by lift and/or drag forces. Drag is the force on the blade in the general direction of the wind. Drag-driven rotors are relatively inefficient because the drag force aids forward motion only through half a cycle, but impedes on the other half cycle. A wall or shield must be provided to block the incoming wind from slowing the side of the rotor that is advanced toward the wind. Cross axis machines thus lose up to half of their rotor collection area due to shielding requirements, a fact of structural efficiency that has long made wind axis machines, and lift type cross axis machines, favored despite their increased relative cost and complexity.

Thus there presently exists a need for a more efficient cross axis, drag type, wind machine that will enable a more complete use of the wind energy that is normally lost due to shielding.

In the description and claims that follow, the term "vertical" is used to describe a direction that is cross wind, since a vertical axis machine is one common way of configuring such a device. It will be understood to one skilled in the art, however, that with appropriate wind direction alignment, that the device of the invention could be configured with a horizontal, cross wind axis with equivalent function.

DETAILED DESCRIPTION OF THE PREFERRED EMBODIMENT

Figure 1:
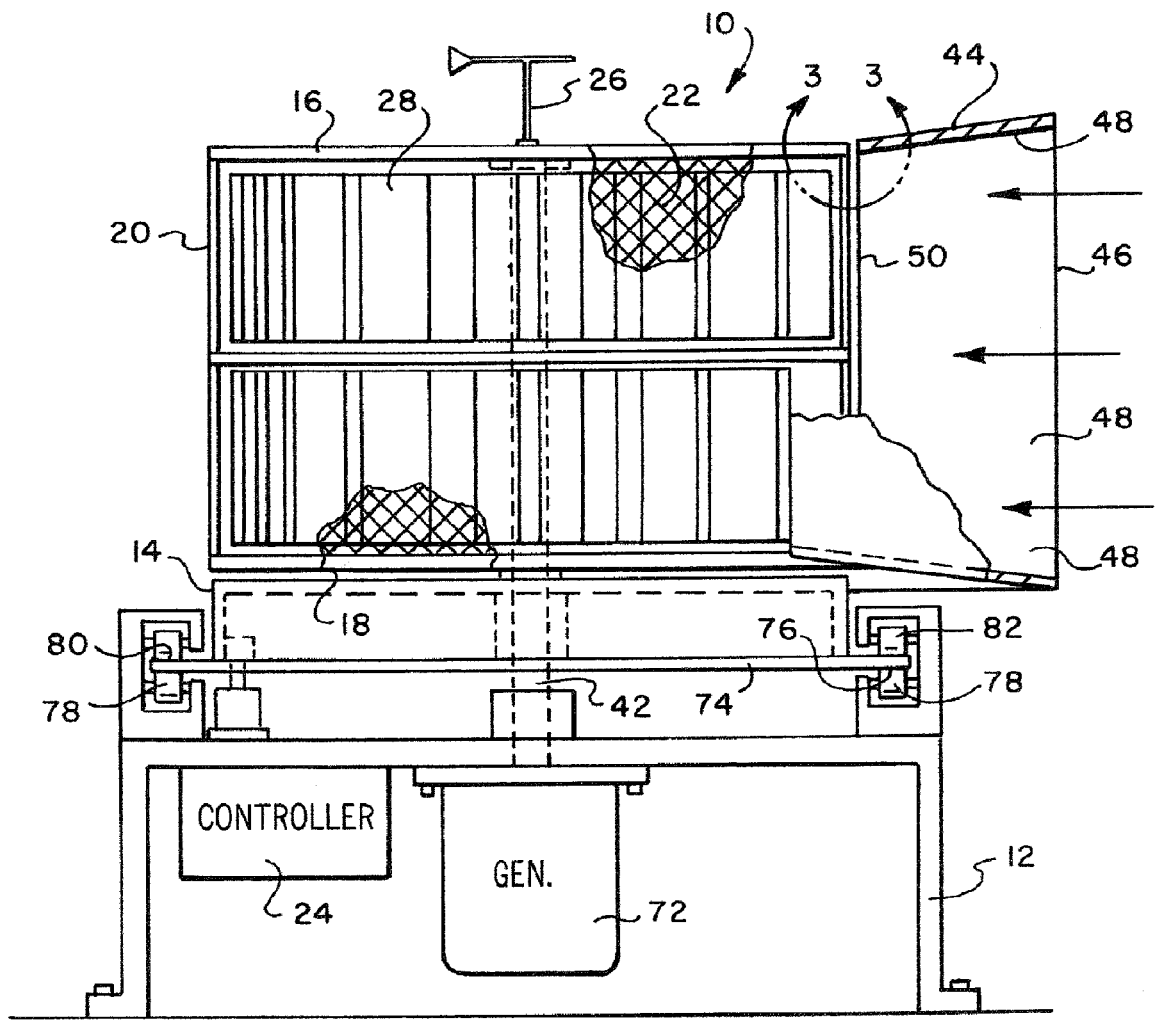
FIG. 1 a partially broken away side view of a wind machine incorporating the invention.
Figure 3:
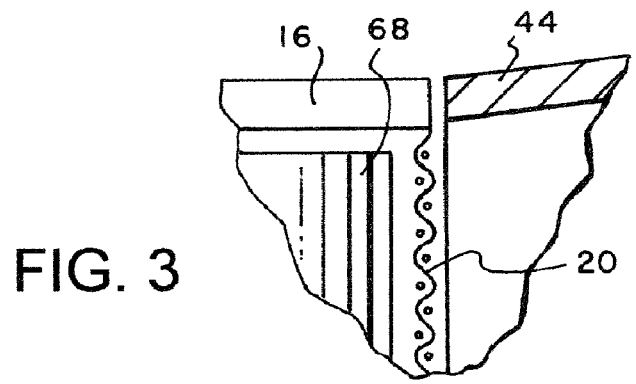
FIG. 3 is an enlargement of the area designated by line 3—3 in FIG. 1.

Referring initially to FIGS. 1 through 6, where like numerals indicate like and corresponding elements, wind energy apparatus 10 has a fixed base 12. A housing 14 is mounted for vertical rotation with respect to the base 12. The housing 14 is vertically cylindrical with a planar top 16, a planar bottom 18, and tubular side wall 20.

The side wall 20 has an air permeable section 22 extending about 270 degrees around the housing 14. The side wall 20 also has an air impermeable section 24 extending about 90 degrees around the housing 14, such that about 270 degrees of the side wall 20 is air permeable and the remaining about 90 degrees of the side wall 20 is air impermeable.

A controller 24 is provided for vertically rotating the housing 14 to a desired orientation with respect to atmospheric wind direction, with the controller being responsive to a wind direction sensor 26.

Figure 2:
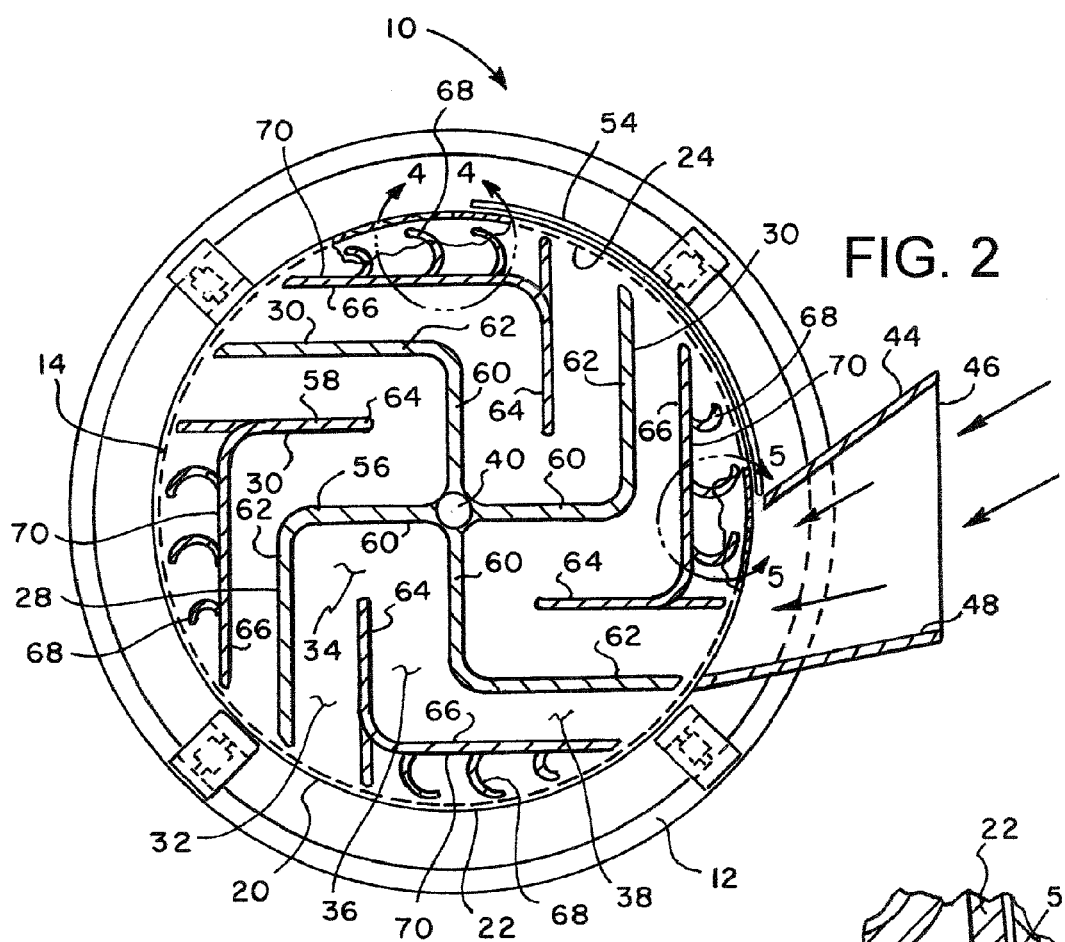
FIG. 2 is a partially broken away top view of the device of FIG. 1.
Figure 4:
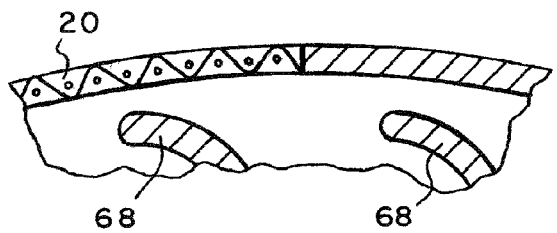
FIG. 4 is an enlargement of the area designated by line 4—4 in FIG. 2.
Figure 5:
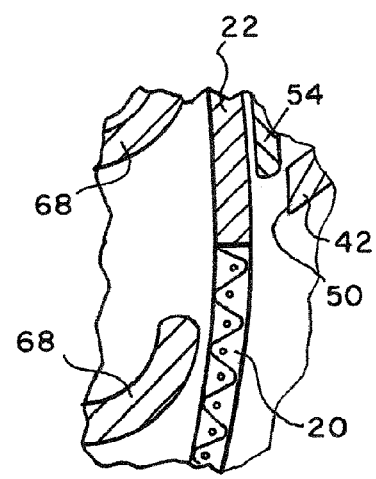
FIG. 5 is an enlargement of the area designated by line 5—5 in FIG. 2.
Figure 6:
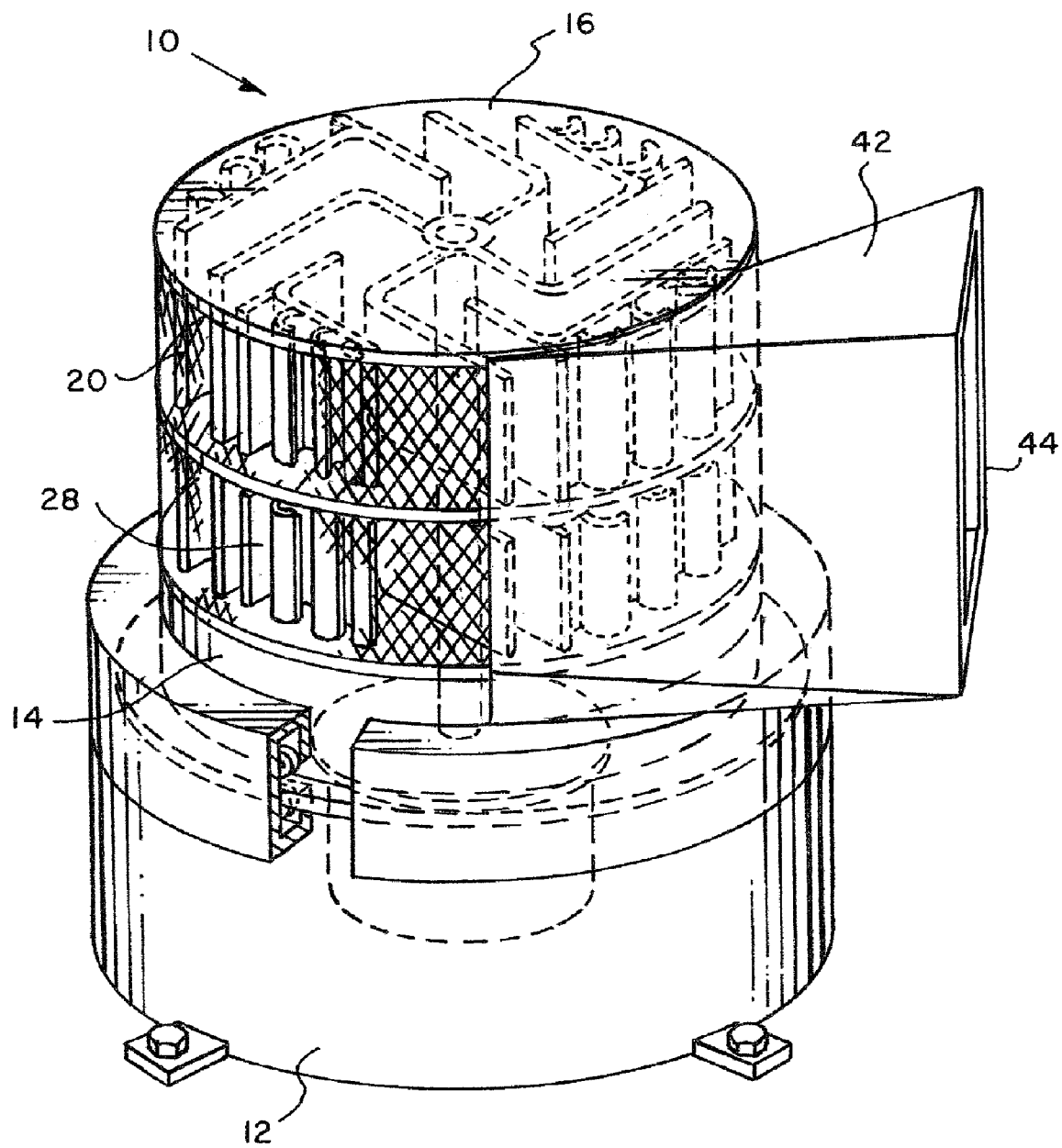
FIG. 6 is a perspective view of the device of FIGS. 1 and 2.

A rotor 28 is mounted for vertical rotation within the housing and formed of a plurality of vertical walls forming four chambers 30 (FIG. 2). Each of the four rotor chambers is formed by the walls into an intake portion 32, a reversal portion 34, a parallel portion 36, and an exhaust portion 38. (For clarity, only one of the chambers in FIG. 2 has portions 32, 34, 36, and 38 labeled, but each of the four chambers has each of the identical four portions in similar locations.)

The intake portions 32 are offset from the center 40 of the rotor 28, with air flow from the intake portion 32 turning in the reversal portion 34 about 90 degrees towards the center 40 of the rotor, with air flow from the reversal portion 34 turning further about 90 degrees in the parallel portion 36 to be in a parallel but reversed direction to the intake portion 32, and with air flow from the parallel portion 36 turning back about 90 degrees in the exhaust portion 38 to be parallel and in the same direction as the reversal portion 34.

A shaft 42 is connected to the rotor 28 for transmitting rotational energy outside the housing 14.

An intake scoop 44 has an open mouth 46 facing the atmospheric wind direction. Walls 48 are arranged to direct wind to a scoop outlet 50 adjacent the rotor 28.

Intake scoop 44 is mounted for vertical rotation with respect to the base 12. Intake scoop 44 is synchronized for corotation with the housing 14 in normal operation.

Intake scoop outlet 50 is generally aligned with the intake portions 32 of the chambers 30, to direct wind into the intake portions 32 of the chambers 30 as they pass by the scoop outlet 50 in normal operation. Scoop 44 is also rotatable out of alignment with the atmospheric wind direction, preferably about 180 degrees with respect to the housing, when normal operation of the apparatus is stopped.

Blocking section 54 is adjacent to and overlapping the air impermeable section 24 of the housing 14 in normal operation. Blocking section 54 is rotatable about 90 degrees with respect to the housing (clockwise in FIG. 2), independently from the scoop 44, to block wind from the intake portions 32 of the chambers when operation of the apparatus is to be stopped. Thus, the blocking section 54, when shifted about 90 degrees, will in combination with the air impermeable section 24 block substantially all wind from the rotor.

The key to the invention is that the rotor chamber walls are interlocking sets of three right-angled walls, each set including two inner walls 56 and an outer wall 58 (FIG. 2). The inner walls 56 have radial legs 60 emanating from the center 40 of the rotor and connected at right angles to offset legs 62. The outer walls 58 have first legs 64 connected at right angles to second legs 66. Each first leg 64 is parallel to one adjacent radial leg 60 of an inner wall 56, and also parallel to one adjacent second leg 66 of the other inner wall 56 of that set, and perpendicular to the radial leg 60 of the other inner wall 56 of that set.

Drag fins 68 extend from outer surfaces 70 of the outer wall second legs 66.

An electrical generator 72 is connected to the shaft 42, although it will be understood that other forms of using rotational energy would be equivalent.

The housing 14 includes a platter 74 (FIG. 1) with a lower peripheral portion 76 supported by lower rollers 78 on the base 14. The platter 74 has an upper peripheral portion 80 restrained by upper rollers 82.

In operation, the combination of flow direction changes provided by the rotor chamber walls, as the rotor turns, enables the application of torques to the rotor at each direction change, thereby more efficiently utilizing all the wind energy available. Air rotates clockwise (as viewed in FIG. 2) in the chamber when air is initially received from scoop outlet 50 into intake portion 32. This is considered Cycle One. Then, when the rotor has turned to the point where exhaust portion 38 is exposed to the scoop outlet 50, the flow of air is reversed and air rotates counter-clockwise in the same chamber. This is Cycle Two. In Cycle Three, air is purged from the chamber via centrifugal force. In Cycle Four, low pressure is maintained as the chamber rotates into the wind again.

Whereas, the present invention has been described with respect to a specific embodiment thereof, it will be understood that various changes and modifications will be suggested to one skilled in the art, and it is intended to encompass such changes and modifications as fall within the scope of the appended claims.

What is claimed is:

1. A wind energy apparatus, comprising:
    a fixed base;
    a housing mounted for vertical rotation with respect to the base; the housing being vertically cylindrical with a planar top, planar bottom and tubular side wall;
    the side wall having an air permeable section extending about 270 degrees around the housing;
    the side wall having an air impermeable section extending about 90 degrees around the housing, such that about 270 degrees of the side wall is air permeable and the remaining about 90 degrees of the side wall is air impermeable;
    a controller for vertically rotating the housing to a desired orientation with respect to atmospheric wind direction, with the controller being responsive to a wind direction sensor; a rotor mounted for vertical rotation within the housing and formed of a plurality of vertical walls forming four chambers;
    each of the four rotor chambers is formed by the walls into an intake portion, a reversal portion, a parallel portion, and an exhaust portion;
    the intake portions being offset from a center of the rotor, with air flow from the intake portion turning in the reversal portion about 90 degrees towards the center of the rotor, with air flow from the reversal portion turning further about 90 degrees in the parallel portion to be in a parallel but reversed direction to the intake portion, and with air flow from the parallel portion turning back about 90 degrees in the exhaust portion to be parallel and in the same direction as the reversal portion; and
    a shaft connected to the rotor for transmitting rotational energy outside the housing.

2. The apparatus of claim 1 with an intake scoop, the intake scoop having an open mouth facing the atmospheric wind direction and walls arranged to direct wind to a scoop outlet adjacent the rotor.

3. The apparatus of claim 2 with the intake scoop being mounted for vertical rotation with respect to the base.

4. The apparatus of claim 3 with the intake scoop being synchronized for co-rotation with the housing in normal operation.

5. The apparatus of claim 4 with the intake scoop outlet being generally aligned with the intake portions of the chambers, to direct wind into the intake portions of the chambers as they pass by the scoop outlet in normal operation.

6. The apparatus of claim 5 with the scoop being rotatable out of alignment with the atmospheric wind direction to stop normal operation of the apparatus.

7. The apparatus of claim 6 with a blocking section which is adjacent to and overlapping the air impermeable section of the housing in normal operation and rotatable independently of the scoop to block wind from the intake portions of the chambers when operation of the apparatus is to be stopped.

8. The apparatus of claim 3 with the rotor chamber walls being interlocking sets of three right-angled walls, each set including two inner walls and an outer wall, the inner walls having radial legs emanating from the center of the rotor connected at right angles to offset legs, and the outer walls having first legs connected at right angles to second legs.

9. The apparatus of claim 8 with drag fins extending from outer surfaces of the outer wall second legs.

10. The apparatus of claim 2 with an electrical generator connected to the shaft.

11. The apparatus of claim 2 with the housing including a platter with a lower peripheral portion supported by lower rollers on the base.

12. The apparatus of claim 11 with the platter having an upper peripheral portion restrained by upper rollers.

13. A wind energy apparatus, comprising:
    a fixed base;
    a housing mounted for vertical rotation with respect to the base; the housing being vertically cylindrical with a planar top, planar bottom and tubular side wall;
    the side wall having an air permeable section extending about 270 degrees around the housing;
    the side wall having an air impermeable section extending about 90 degrees around the housing, such that about 270 degrees of the side wall is air permeable and the remaining about 90 degrees of the side wall is air impermeable;
    a controller for vertically rotating the housing to a desired orientation with respect to atmospheric wind direction, with the controller being responsive to a wind direction sensor;
    a rotor mounted for vertical rotation within the housing and formed of a plurality of vertical walls forming four chambers;
    each of the four rotor chambers is formed by the walls into an intake portion, a reversal portion, a parallel portion, and an exhaust portion;
    the intake portions being offset from a center of the rotor, with air flow from the intake portion turning in the reversal portion about 90 degrees towards the center of the rotor, with air flow from the reversal portion turning further about 90 degrees in the parallel portion to be in a parallel but reversed direction to the intake portion, and with air flow from the parallel portion turning back about 90 degrees in the exhaust portion to be parallel and in the same direction as the reversal portion
    a shaft connected to the rotor for transmitting rotational energy outside the housing;
    an intake scoop, the intake scoop having an open mouth facing the atmospheric wind direction and walls arranged to direct wind to a scoop outlet adjacent the rotor;
    with the intake scoop being mounted for vertical rotation with respect to the base; with the intake scoop being synchronized for co-rotation with the housing in normal operation;
    with the intake scoop outlet being generally aligned with the intake portions of the chambers, to direct wind into the intake portions of the chambers as they pass by the scoop outlet in normal operation;

with scoop being rotatable out of alignment with the atmospheric wind direction to stop normal operation of the apparatus;

with a blocking section which is adjacent to and overlapping the air impermeable section of the housing in normal operation and rotatable independently of the scoop to block wind from the intake portions of the chambers when operation of the apparatus is to be stopped;

with the rotor chamber walls being interlocking sets of three right-angled walls, each set including two inner walls and an outer wall, the inner walls having radial legs emanating from the center of the rotor connected at right angles to offset legs, and the outer walls having first legs connected at right angles to second legs;

with drag fins extending from outer surfaces of the outer wall second legs;

with an electrical generator connected to the shaft;

with the housing including a platter with a lower peripheral portion supported by lower rollers on the base; and with the platter having an upper peripheral portion restrained by upper rollers.

* * * * *